(12) United States Patent
Buck

(10) Patent No.: US 9,895,712 B2
(45) Date of Patent: Feb. 20, 2018

(54) NOZZLE ELEMENT FOR INTRODUCING A LIQUID INTO A JOINT, AND METHOD FOR INTRODUCING A LIQUID INTO A JOINT

(71) Applicant: SIKA TECHNOLOGY AG, Baar (CH)

(72) Inventor: Manuel Buck, Gebenstorf (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/911,710

(22) PCT Filed: Aug. 14, 2014

(86) PCT No.: PCT/EP2014/067401
§ 371 (c)(1),
(2) Date: Feb. 11, 2016

(87) PCT Pub. No.: WO2015/022393
PCT Pub. Date: Feb. 19, 2015

(65) Prior Publication Data
US 2016/0193625 A1 Jul. 7, 2016

(30) Foreign Application Priority Data
Aug. 14, 2013 (EP) .................................... 13180457

(51) Int. Cl.
| | |
|---|---|
| *B05C 17/005* | (2006.01) |
| *B05C 21/00* | (2006.01) |
| *E04F 21/165* | (2006.01) |
| *B29C 65/48* | (2006.01) |
| *B29K 83/00* | (2006.01) |

(52) U.S. Cl.
CPC ...... *B05C 17/00516* (2013.01); *B29C 65/481* (2013.01); *E04F 21/1652* (2013.01); *B29K 2083/00* (2013.01)

(58) Field of Classification Search
USPC .......................................................... 156/578
See application file for complete search history.

(56) References Cited

U.S. PATENT DOCUMENTS

| | | | | |
|---|---|---|---|---|
| 3,797,946 A | * | 3/1974 | Witzmann | ............. B65D 47/42 401/116 |
| 4,695,185 A | * | 9/1987 | Spells | ............... B05C 17/00516 141/311 R |
| 6,179,506 B1 | | 1/2001 | Dewberry | |
| 6,199,612 B1 | | 3/2001 | Costa Pereira et al. | |

(Continued)

FOREIGN PATENT DOCUMENTS

| | | |
|---|---|---|
| CN | 1194903 A | 10/1998 |
| CN | 1980780 A | 6/2007 |

(Continued)

OTHER PUBLICATIONS

International Search Report (PCT/ISA/210) dated Oct. 15, 2014, by the European Patent Office as the International Searching Authority for International Application No. PCT/EP2014/067401.

(Continued)

*Primary Examiner* — Sing P Chang
(74) *Attorney, Agent, or Firm* — Buchanan Ingersoll & Rooney PC

(57) ABSTRACT

The invention relates to a nozzle element for introducing a liquid, in particular an adhesive material and/or a sealing material, into a joint, having an outlet opening, wherein at least one cushion-like bulged covering element is provided, which encompasses the outlet opening at least sectionally, in particular entirely, such that during the introduction, areas of the joint and/or joint edges adjacent to the outlet opening are covered.

23 Claims, 2 Drawing Sheets

(56) References Cited

U.S. PATENT DOCUMENTS

| | | |
|---|---|---|
| 7,897,527 B2 | 3/2011 | Yoshida |
| 8,943,969 B2 | 2/2015 | Castillo et al. |
| 2004/0086321 A1 | 5/2004 | Burkholz et al. |
| 2006/0014463 A1 | 1/2006 | Yoshida |
| 2009/0211480 A1 | 8/2009 | Castillo et al. |
| 2012/0272894 A1 | 11/2012 | Schuster |

FOREIGN PATENT DOCUMENTS

| | | | |
|---|---|---|---|
| CN | 201659064 U | 12/2010 | |
| CN | 101952122 A | 1/2011 | |
| EP | 1 065 007 A2 | 1/2001 | |
| GB | EP 1295647 A1 * | 3/2003 | ............. B05B 1/185 |

OTHER PUBLICATIONS

Written Opinion (PCT/ISA/237) dated Oct. 15, 2014, by the European Patent Office as the International Searching Authority for International Application No. PCT/EP2014/067401.

Notification of Transmittal of Translation of the International Preliminary Report on Patentability (Forms PCT/IB/338 and PCT/IB/373) and the Written Opinion of the International Searching Authority (Form PCT/ISA/237) dated Feb. 25, 2016 by International Bureau of WIPO, in corresponding International Application No. PCT/EP2014/067401. (6 pages).

Office Action (Notification of the First Office Action) dated May 4, 2017, by the State Intellectual Property Office of the People's Republic of China in corresponding Chinese Patent Application No. 201480045017.7, and an English Translation of the Office Action. (18 pages).

Office Action (Communication pursuant to Articles 94(3) EPC) dated May 17, 2017, by the European Patent Office in corresponding European Patent Application No. 14752315.3-1760. (4 pages).

Office Action (Notification of the Second Office Action) dated Nov. 17, 2017, by the State Intellectual Property Office of the Peoples Republic of China in corresponding Chinese Patent Application No. 201480045017.7, and an English Translation of the Office Action. (12 pages).

* cited by examiner

NOZZLE ELEMENT FOR INTRODUCING A LIQUID INTO A JOINT, AND METHOD FOR INTRODUCING A LIQUID INTO A JOINT

TECHNICAL FIELD

The invention relates to a nozzle element for introducing a liquid into a joint as claimed in claim 1, to a system comprising a nozzle element and a joint as claimed in claim 9, to a use of a nozzle element as claimed in claim 11, and to a method for introducing a liquid into a joint as claimed in claim 12.

PRIOR ART

Nozzle elements for introducing compositions in the form of a gel and/or paste are already known from the prior art.

It is furthermore known, for example, to introduce adhesives or sealants into a joint between two components (for example a cover plate for a solar collector and a solar collector frame) by means of such nozzle elements.

In this context it is found disadvantageous that excess material of the composition in the form of a gel and/or paste has to be removed elaborately after introduction of the composition into the joint. It is proposed, for example, to remove the excess material with the aid of a scraper. This leads to a relatively long processing and a time high outlay in terms of equipment and design.

The object of the invention is to provide a nozzle element for introducing a liquid into a joint and a method for introducing a liquid into a joint, with which the outlay on production and equipment is reduced in comparison with the prior art. A corresponding system consisting of a nozzle element and a joint, as well as a corresponding use of a nozzle element, are furthermore intended to be proposed.

This object is achieved by a nozzle element as claimed in claim 1, a system as claimed in claim 9, a use as claimed in claim 11 and a method as claimed in claim 12.

The object is achieved in particular by a nozzle element for introducing a liquid, in particular an adhesive and/or sealant, into a joint, the nozzle element comprising an outlet opening, at least one cover element curved outward in the manner of a cushion being provided, which encloses the outlet opening at least in sections, in particular fully, in such a way that regions of the joint and/or joint edges adjacent to the outlet opening are covered during the introduction.

SUMMARY OF THE INVENTION

One central idea of the invention is that the outlet opening is enclosed (at least partially) by a cover element curved outward in the manner of a cushion (cushion element), so that the joint or joint edges which are adjacent to the outlet opening (during the introduction of the liquid) are covered at least in sections. In this way, liquids already introduced "online", i.e. in one go, and, the emergence of excess liquid is lessened or at least reduced. This in turn avoids elaborate removal of excess liquid, so that the outlay on equipment or production is reduced.

An outlet opening is intended to mean that opening of the nozzle element at which the liquid emerges, or leaves the nozzle element. The liquid may, in particular, be materials which are gel-like and/or in the form of a paste, in particular an adhesive and/or sealant.

Preferably, the viscosity of the liquid has a value of $10^3$-$2.5 \times 10^6$ mPa*s, in particular $10^4$-$2 \times 10^6$ mPa*s, most preferably $10^5$-$10^6$ mPa*s, measured according to DIN 53018 by means of an Anton-Paar rheometer (Physica MCR 101, cone-plate CP 25-1, temperature 23° C., shear rate 0.5 sec$^{-1}$).

For example, a silicone sealant and/or adhesive may be envisioned as the sealant and/or adhesive. Such silicone sealants and/or adhesives are often used, in particular, for sealing joints. In general, a liquid should be understood as anything which can flow at least in an initial state (i.e. in a state before the "liquid" leaves the nozzle element). For example, the liquid may be a wet gel which dries only in the joint and gives up its liquid component there (at least partially). A "cover element curved outward in the manner of a cushion" is intended, in particular, to mean an element which is deformable under pressure and in a neutral state (i.e. before the effect of pressure) protrudes from the other components of the nozzle element. In one specific embodiment, the outlet opening is defined by the cover element. In such an embodiment, the cover element curved outward in the manner of a cushion comprises an (at least one) opening, which is at the same time the outlet opening. A maximum diameter of the cover element may be at least 1.5 times, preferably 2 times, even more preferably at least 4 times as great as a maximum diameter of the outlet opening. A maximum diameter of the outlet opening may be at least 0.05 times, preferably at least 0.1 times as great as a maximum diameter of the cover element. This ensures that sufficient covering of the joint and/or of joint edges is to made possible. Particularly preferably, the (maximum) diameter of the cover element is dictated by a depth of the joint to be filled. The cover element may have a (maximum) diameter of (about) 40 mm to 100 mm, in particular (about) 70 mm. The outlet opening may have a (maximum) diameter of (about) 3 mm to 7 mm, in particular (about) 5 mm.

A cover element "curved outward in the manner of a cushion" is intended, in particular, to mean a cover element which (in cross section) has a section extending flat (in a planar fashion) (within which the outlet opening is arranged). Between the planar section and the edge of the cover element, it is configured (in cross section) drawing (curved) backward, so that the planar section protrudes forward (i.e. in the direction of the outlet opening). A surface of the cover element is (apart from the outlet opening) preferably configured in such a way that the surface is liquid-tight (i.e. it prevents liquid from entering). Preferably, there is precisely one outlet opening, or at least a small number of outlet openings (for example from 1 to 10 or from 1 to 5). A circumferential edge of the cover element is preferably configured to be curved (and preferably does not have any edges). Provided inside the cover element, there is preferably a liquid channel (in particular precisely one liquid channel or from 1 to 5 or from 1 to 10 liquid channels), which ends (or end) in the outlet opening. The cover element thus encloses a channel (or defines one), which remains free for liquid to pass through. A diameter of this channel may correspond to the diameter as explained in relation to the outlet opening.

Preferably, the cover element is configured as a resilient element or comprises such. One central idea of this refinement is to provide a (reversibly) deformable cover element. When such a cover element comes in (pressure) contact with joint edges, it presses against the joint edges and effectively prevents contamination of the joint edges. A "joint edge" is intended to form a region, adjacent to a joint, of the elements defining the joint (for example a cover plate of a solar collector and a solar collector frame). As an alternative or in addition, a resilient property may be provided by a particular material selection.

Preferably, the at least one cover element protrudes from the other components (elements) of the nozzle element.

In one specific embodiment, a (rigid) housing is provided. The housing preferably defines a reception space for the liquid, so that the liquid can be fed (by a delivery device) to the outlet opening. The housing (liquid reception chamber) is preferably made of metal (at least partially). Particularly preferably, the cover element projects from an end, associated with the outlet opening, of the housing. Particularly when the cover element is configured to be (elastically) deformable, in such an embodiment an application pressure of the cover element on the joint edges can be adjusted by adjusting the distance between the housing and the joint edges. Preferably, the cover element is (partially) arranged inside the housing, or is held by the housing.

The cover element is preferably (at least in sections) formed from a first material. This first material preferably has an E modulus ≤30 MPa, more preferably ≤5 MPa, even more preferably ≤1 MPa. By such a relatively low E modulus, a high flexibility of the cover element is made possible, so that the cover element can be pressed particularly effectively onto the joint edges. Preferably, the first material lies in an inner section of the cover element (i.e. in a sectional which lies away from the outlet opening).

A second material may furthermore be provided. This second material is formed in particular on a surface of the cover element, i.e. in a region which lies closer to the outlet opening, or faces outward. Particularly preferably, an E modulus of the second material is 1.5 times, more preferably 3 times, even more preferably 10 times as great as the E modulus of the first material. Specifically, the E modulus of the second material may be ≥100 MPa, preferably ≥1000 MPa, even more preferably ≥10000 MPa. In one specific embodiment, the second material forms a surface layer, which covers the first material. By such a combination, on the one hand a high elasticity of the cover element is achieved and, nevertheless (because of the high E modulus of the second material), a stable cover element is produced, which is distinguished in particular by a low friction resistance of the nozzle element (when the nozzle element slides along a joint). In this way, the lifetime of the cover element, and therefore of the nozzle element, is increased. It is particularly preferred in this context for the second material to be a dense material (i.e. for it not to have pores) and for the first material to be a porous material (for example foam material, in particular plastic foam, as described in CD Römpp Chemie Lexikon, Version 1.0, Georg Thieme Verlag, Stuttgart 1995). Such a configuration on the one hand prevents liquid from entering the cover element, and nevertheless, because of the configuration of the first material like a foam material, a cushion effect is produced so that the cover element as a whole can advantageously be pressed onto joint edges.

The first material of the cover element (in particular arranged inside the cover element) may generally be foam material, preferably made of polyethylene or based on polyethylene. The second material of the cover element (in particular arranged on the surface of the cover element) is in particular a polymer, preferably a polymer with a high molecular weight. High molecular weight polyethylene or ultrahigh molecular weight polyethylene may be envisioned in particular as such a polymer. A high molecular weight is intended in particular to mean a molecular weight of at least 500 kg/mol, preferably at least 1000 kg/mol. Such high molecular weight polymers have a relatively high wear and abrasion strength as well as good sliding properties. Reliable covering (or sealing) of joint edges with a long lifetime of the nozzle element is therefore achieved. In one specific embodiment, the material of the cover element (arranged on the surface of the cover element) is polytetrafluoroethylene (PTFE). The PTFE is preferably in the form of a mesh fabric (glass fabric or glass fabric sheet).

A material forming the surface of the cover element at least in sections may have a Shore D hardness ≥50, preferably ≥80, even more preferably ≥90 (at a temperature of 30° C.). A friction coefficient may be ≤0.4, preferably ≤0.3, even more preferably ≤0.2. A "friction coefficient" is intended to mean the friction coefficient according to the German Industry Standard (DIN) 53375 in force at the time of application. By a high hardness, or a low friction coefficient, the sliding properties of the cover element are improved. Furthermore, in particular by a relatively low friction coefficient, adhesion of the liquid to the cover element is prevented, or at least reduced. Furthermore, by a low friction coefficient, the nozzle element can be moved in different directions without jerking taking place (because of a direction change).

In one embodiment, the cover element is convexly configured. As an alternative or in addition, the cover element is circular. With such a configuration, reliable covering (sealing) of joint edges can be produced in a straightforward way. Preferably, a cross section of the cover element is circular. In this way, a direction change when sliding the nozzle element is simplified. As an alternative or in addition, the housing (or a liquid reception chamber) may also be circular. This also further improves the maneuverability (ability to change direction) of the nozzle element.

The aforementioned object is furthermore achieved by a system comprising the nozzle element of the type described above and a joint (or two elements which form a joint between them, for example an insert (glass plate) and a frame), wherein a surface of the cover element has a higher hardness (according to Mohs or Shore D at 23° C.) and/or a lower friction coefficient than a surface of one or both joint edges. The friction coefficient of the surface of the cover element is preferably at least 1.2, even more preferably at least 1.5 times as great as the friction coefficient of one or both joint edges. Overall, the effect achieved by such an adjustment of the hardness or the friction coefficients is that abrasion-resistant sliding is made possible, without particularly high forces having to be exerted. At the same time, entrainment of liquid by the nozzle element is reduced, or even entirely prevented. Overall, clean filling of the joint is made possible in a straightforward way.

A maximum diameter of the outlet opening is preferably less than a maximum width of the joint. As an alternative or in addition, a maximum width of the cover element is preferably greater than a maximum diameter of the joint. With such a configuration, the cover element covers not only joint edges but also (at least partially) the joint itself. In this way, liquid (for example adhesive) is pressed particularly effectively into the joint, without liquid being able to emerge outward (at least, this is significantly reduced). The joint may have a width of from 3 to 7 mm, in particular (about) 5 mm.

The object is furthermore achieved by the use of a nozzle element of the type described above for introducing a liquid into a joint. In relation to the advantages, reference is made to the comments about the nozzle element and about the system consisting of a nozzle element and a joint.

Furthermore, the object is achieved by a method for introducing a liquid into a joint, comprising the steps:
  ejecting the liquid through an outlet opening of a nozzle element, in particular of the type described above, in the direction of the joint;

at least partially covering regions of the joint and/or joint edges adjacent to the outlet opening.

The step of covering takes place, in particular, simultaneously with the step of ejecting the liquid. In relation to the advantages, reference is made to the comments about the nozzle element, or about the system consisting of a nozzle element and a joint.

As a result, by the present invention a determined volume of the joint can be sealed in a straightforward way when introducing a liquid. The volume may depend on the movement speed of the nozzle, or on the volume of liquid applied per unit time. Overall, behavior is achieved which is (at least almost) independent of the sliding direction of the nozzle. In this way, alignment of the nozzle in a particular running direction is no longer necessary. For example when a rectangular joint is intended to be filled, rotation of the nozzle in the region of the corners can be obviated. Rapid maneuvering is therefore possible.

Other embodiments may be found in the dependent claims.

BRIEF DESCRIPTION OF THE DRAWINGS

The invention will also be described below in relation to further features and advantages with the aid of an exemplary embodiment, which will be explained in more detail with the aid of the following figures, in which.

EMBODIMENT OF THE INVENTION

In the description below, the same reference numbers are used for parts which are the same and have the same effect.

Figure 1:
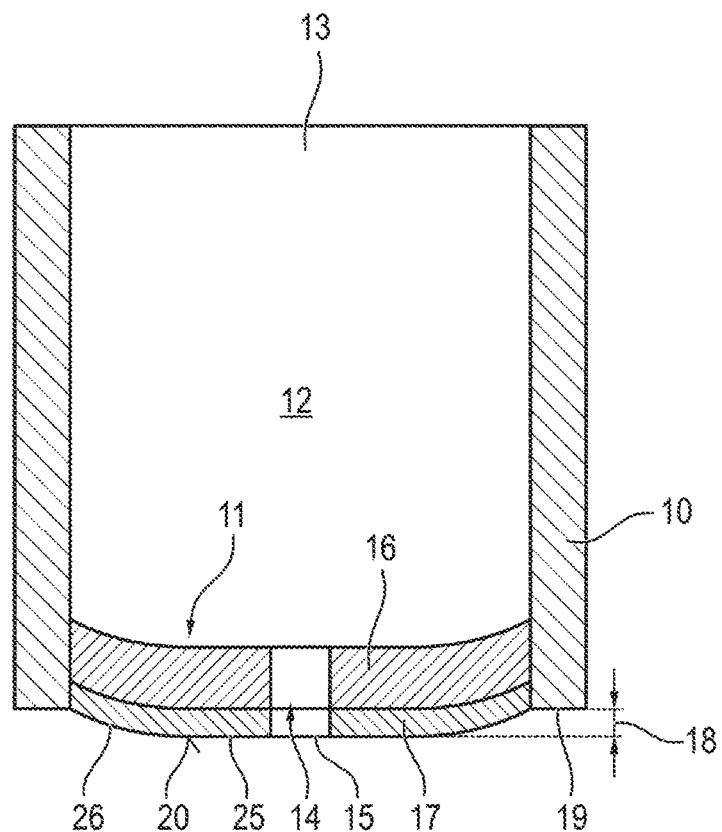
FIG. 1 shows a schematic sectional view of a nozzle element.
Figure 2:
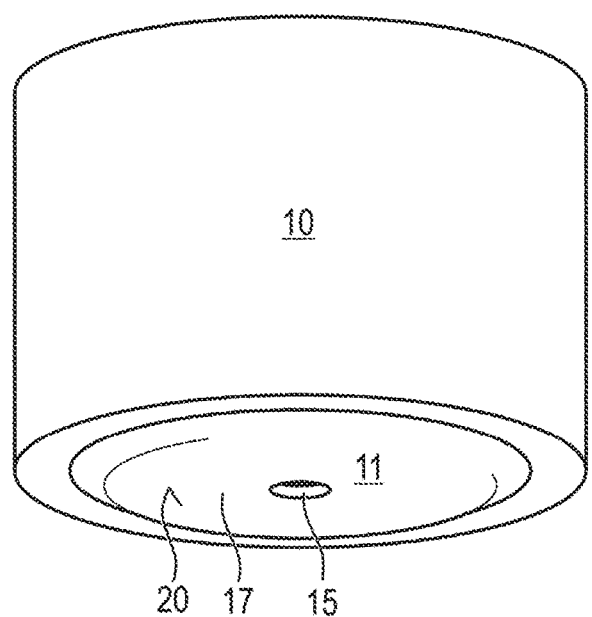
FIG. 2 shows an oblique view of the nozzle element according to FIG. 1.

The nozzle element of FIGS. 1 and 2 comprises a housing 10 and a cover element 11. The housing 10 is cylindrically shaped and consists of a metal. Inside the housing 10, there is a liquid reception space 12, via which liquid is guided by a delivery device (not illustrated in detail) indicated by the reference number 13 in the direction of a liquid channel 14, which lies inside the cover element 11. At a distal end of the liquid channel 14, there is situated an outlet opening 15 (i.e. the opening from which the liquid emerges).

A surface 20 of the cover element 11 (which is externally accessible) preferably has a planar section 25 and a curved section 26 drawing back. The planar section 25 encloses the outlet opening 15 and is centrally arranged. The curved section 26 in turn encloses the planar section 25 and extends on an edge of the surface 20. In this way, the planar section 25 protrudes, so that reliable covering by the cover element 11 can be achieved. At the same time, the effect of the curved section 26 is that movement of the cover element along the joint can be carried out in a straightforward way.

The cover element 11 is constructed in two layers, and comprises a first layer 16 (inner layer) of a first material and a second layer 17 (of a second material). The first layer 16 is (approximately) two to three times as thick as the second layer 17. The first material is preferably foam material. The second material preferably a polymer (with a high molecular weight). By the material configuration and the convex structure, the cover element is curved outward in the manner of a cushion, and protrudes from the housing 10 by a distance 18 from an end 19, associated with the outlet opening 15, of the housing 10. The distance 18 may for example (in the neutral state, or in the state in which no pressure acts on the cover element 11) be at least 1 mm, more preferably at least 2 mm, even more preferably at least 4 mm. The upper limit for the distance 18 is preferably 8 mm, more preferably 6 mm. The cover element 11 is circularly configured.

Via the nozzle element, a liquid (in particular adhesive) can be introduced into a joint (not represented). In this case, the surface 20 of the cover element 11 is (at least partially) in contact with joint edges.

Figure 3:
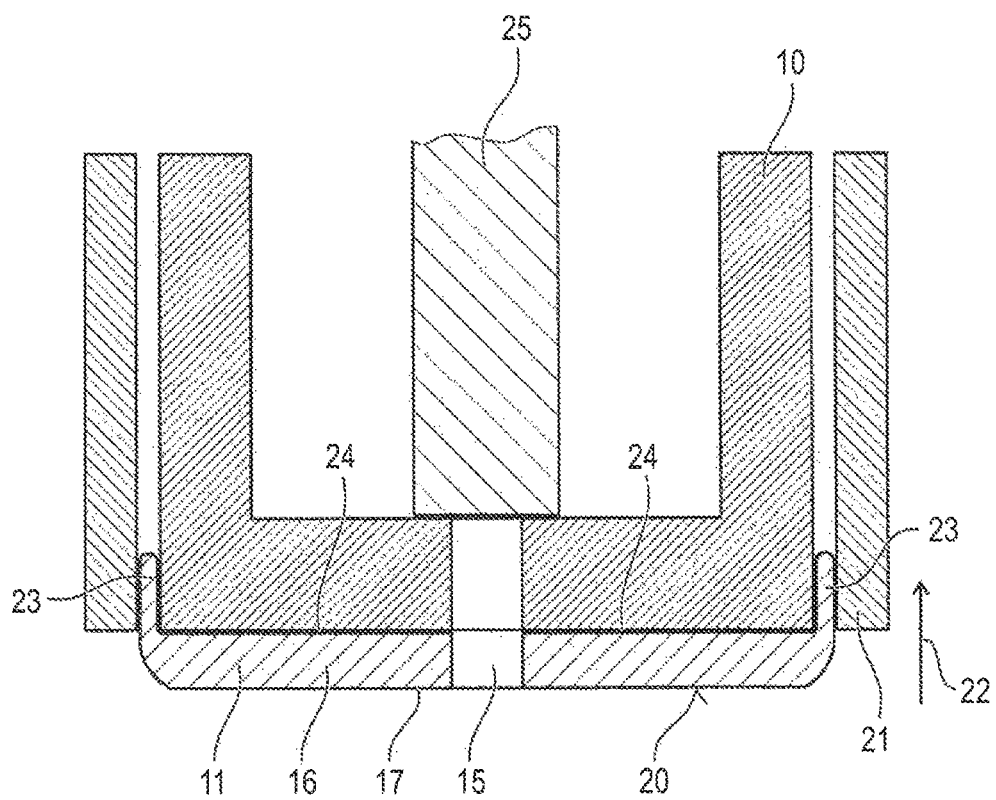
FIG. 3 shows a schematic sectional view of a nozzle element.

FIG. 3 shows an alternative configuration of a nozzle element in a schematic sectional view. The cover element 11 in FIG. 3 may have the structure described in relation to FIGS. 1 and 2. The second layer 17 (defining the surface 20) is in the specific embodiment a PTFE glass fabric sheet. This PTFE glass fabric sheet (or in general the second layer 17) may be adhesively bonded onto the first layer 16. The thickness of an adhesive layer lying between the first and second layers is preferably from 0.05 mm to 0.2 mm. The first layer 16 is preferably a (polyethylene) foam material. The cover element 11 is fitted onto the housing 10 and thus held. The fitting may be carried out by moving a ring 21 in the direction of an arrow 22 (from the bottom upward in FIG. 3) onto the housing 10. In this way, on the one hand, the cover element 11 is fitted over the housing and, on the other hand, a distal edge section 23 of the cover element 11 is squeezed between the housing 10 and the ring. The ring 21 may be (but does not have to be) circularly configured. In the region of the distal edge section 23 (in the mounted or squeezed state), the cover element 11 has a thickness less by at least the factor 3 (preferably by the factor 5) than in the other regions. In this way, the cover element 11 is reliably held on the housing 10. Furthermore, the cover element 11 may be adhesively bonded to the housing 10 (for example on a front section 24 of the housing 10). Here as well, an adhesive layer preferably has a thickness of from 0.05 mm to 0.2 mm.

The reference number 25 furthermore indicates an (optional), preferably static, mixer. Such a (static) mixer is, for example, advantageous when a two-component adhesive and/or sealant is used.

The cover element 11 may, in the (squeezed) edge region 23, have a thickness of from 0.5 mm to 1.5 mm, specifically 1 mm. In the other regions (or in the unsqueezed state), the cover element may have a thickness of from 3 mm to 7 mm, preferably 5 mm.

It should be pointed out here that all parts described above, are claimed as being essential to the invention independently and in any combination, in particular the details represented in the drawings). Variants thereof are familiar to the person skilled in the art.

LIST OF REFERENCES 10 housing
11 cover element
12 liquid reception space
13 delivery device
14 liquid channel
15 outlet opening
16 first layer
17 second layer
18 distance
19 end
20 surface
21 ring 22 arrow
23 edge section
24 front section
25 planar section
26 curved section

The invention claimed is:

1. A nozzle element for introducing a liquid into a joint, the nozzle element comprising:
an outlet opening;
at least one cover element curved outward and enclosing the outlet opening at least in sections, such that regions of a joint and/or joint edges adjacent to the outlet opening will be covered during introduction of liquid by the nozzle element;
wherein the cover element contacts an inner surface of a side wall of the nozzle element;
and wherein a first material of the cover element is arranged inside the cover element and a second material of the cover element is arranged on an outer surface of the cover element, the second material being different from the first material.

2. The nozzle element as claimed in claim 1,
wherein the cover element is configured as, or includes, a resilient element.

3. The nozzle element as claimed in claim 1,
wherein the at least one cover element protrudes from other components of the nozzle element.

4. The nozzle element as claimed in claim 1, in combination with a housing, at least one cover element projecting from an end associated with the outlet opening.

5. The nozzle element as claimed in claim 1, wherein the cover element is formed at least in sections from the first material, and the first material has an E modulus ≤30 MPa; and/or
at least sections are formed from the second material, and the second material has an E modulus greater by at least 1.5 times than the E modulus of the first material.

6. The nozzle element as claimed in claim 1, wherein the first material is a foam material, and/or the second material is a polymer.

7. The nozzle element as claimed in claim 1, wherein a material forming a surface of the cover element has, at least in sections, a Shore D hardness ≥50, and/or has a friction coefficient ≤0.4.

8. The nozzle element as claimed in claim 1, wherein the cover element is convexly configured; and/or the cover element is circular; and/or
a cross section of the housing and/or of a liquid reception chamber is circular.

9. A system comprising:
a nozzle element as claimed in claim 1 and a joint, wherein a surface of the cover element has a higher hardness than a surface of joint edges and/or has a lower friction coefficient.

10. The system as claimed in claim 9,
wherein a maximum diameter of the outlet opening is less than a maximum width of the joint; and/or
a maximum diameter of the cover element is greater than a maximum width of the joint.

11. The nozzle element as claimed in claim 1, in combination with a rigid housing, at least one cover element projecting from an end associated with the outlet opening.

12. The nozzle element as claimed in claim 1, wherein the cover element is formed at least in sections from the first material, and the first material has an E modulus ≤5 MPa; and/or
at least sections are formed from the second material, and the second material has an E modulus greater by at least 3 times than the E modulus of the first material.

13. The nozzle element as claimed in claim 1, wherein the cover element is formed at least in sections from the first material, and the first material has an E modulus ≤1 MPa; and/or
at least sections are formed from the second material, and the second material has an E modulus greater by at least 10 times than the E modulus of the first material.

14. The nozzle element as claimed in claim 1, wherein the first material is a foam material, and/or the second material is a polymer with a high molecular weight.

15. The nozzle element as claimed in claim 1, wherein a material forming a surface of the cover element has, at least in sections, a Shore D hardness ≥80, and/or has a friction coefficient of ≤0.3.

16. The nozzle element as claimed in claim 1, wherein a material forming a surface of the cover element has, at least in sections, a Shore D hardness ≥90, and/or has a friction coefficient of ≤0.2.

17. The nozzle element as claimed in claim 1, wherein a material forming a surface of the cover element has, at least in sections, a Shore D hardness ≥90, and/or has a friction coefficient of ≤0.1.

18. The nozzle element as claimed in claim 1, configured to introduce an adhesive and/or sealant as the liquid.

19. The nozzle element as claimed in claim 1, wherein the cover element is formed at least in sections from the first material, and the first material has an E modulus ≤30 MPa; and/or
at least sections are formed from the second material, and the second material has an E modulus ≥100 MPa.

20. The nozzle element as claimed in claim 1, wherein the cover element is formed at least in sections from the first material, and the first material has an E modulus ≤5 MPa; and/or
at least sections are formed from the second material, and the second material has an E modulus ≥1000 MPa.

21. The nozzle element as claimed in claim 1, wherein the cover element is formed at least in sections from the first material, and the first material has an E modulus ≤1 MPa; and/or
at least sections are formed from the second material, and the second material has an E modulus ≥10,000 MPa.

22. A method for introducing a liquid into a joint, comprising:
introducing an adhesive and/or sealant, into a joint via an outlet opening of a nozzle element; and
enclosing, via at least one cover element curved outward, the outlet opening at least in sections, such that regions of the joint and/or joint edges adjacent to the outlet opening will be covered during introduction of liquid by the nozzle element;
wherein the at least one cover element contacts an inner surface of a side wall of the nozzle element;
and wherein a first material of the at least one cover element is arranged inside the at least one cover element and a second material of the at least one cover element is arranged on an outer surface of the at least one cover element, the second material being different from the first material.

23. A method for introducing a liquid, as an adhesive and/or sealant, via a nozzle element, into a joint, the method comprising:
ejecting the liquid through an outlet opening of the nozzle element, in the direction of the joint, via at least one cover element curved outward, wherein the at least one cover element contacts an inner surface of a side wall of the nozzle element, and wherein a first material of the at least one cover element is arranged inside the at least one cover element and a second material of the at least one cover element is arranged on an outer surface of the at least one cover element, the second material being different from the first material; and at least partially covering regions of the joint and/or joint edges adjacent to the outlet opening.

* * * * *